United States Patent
Xu et al.

(10) Patent No.: US 9,332,274 B2
(45) Date of Patent: May 3, 2016

(54) SPATIALLY SCALABLE VIDEO CODING

(75) Inventors: Ji-Zheng Xu, Beijing (CN); Ruiqin Xiong, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 2498 days.

(21) Appl. No.: 11/483,150

(22) Filed: Jul. 7, 2006

(65) Prior Publication Data

US 2008/0008252 A1  Jan. 10, 2008

(51) Int. Cl.
   *H04N 19/59* (2014.01)
   *H04N 19/61* (2014.01)
   *H04N 19/33* (2014.01)

(52) U.S. Cl.
   CPC ............. *H04N 19/59* (2014.11); *H04N 19/33* (2014.11); *H04N 19/61* (2014.11)

(58) Field of Classification Search
   CPC ................ H04N 19/00436; H04N 19/00757; H04N 19/00781; H04N 19/59; H04N 19/61; H04N 19/33
   USPC ........................................ 375/240.01–240.29
   See application file for complete search history.

(56) References Cited

U.S. PATENT DOCUMENTS

| | | | |
|---|---|---|---|
| 6,266,817 B1 | 7/2001 | Chaddha | |
| 6,314,452 B1 | 11/2001 | Dekel et al. | |
| 6,587,109 B1 | 7/2003 | Rose et al. | |
| 6,628,714 B1 | 9/2003 | Fimoff et al. | |
| 6,990,241 B2 | 1/2006 | Natarajan et al. | |
| 7,027,512 B2 | 4/2006 | Jeon | |
| 7,099,389 B1 * | 8/2006 | Yu et al. | 375/240.12 |
| 7,876,833 B2 * | 1/2011 | Segall et al. | 375/240.24 |
| 7,889,937 B2 * | 2/2011 | Kirenko | 382/240 |
| 7,912,125 B2 * | 3/2011 | Comer et al. | 375/240.1 |
| 8,005,137 B2 * | 8/2011 | Han et al. | 375/240 |
| 8,218,628 B2 * | 7/2012 | Schwarz et al. | 375/240.1 |
| 8,396,123 B2 * | 3/2013 | Han et al. | 375/240.12 |
| 2003/0128760 A1 | 7/2003 | Lee et al. | |
| 2003/0133500 A1 | 7/2003 | Auwera et al. | |
| 2004/0101204 A1 | 5/2004 | King | |
| 2005/0047509 A1 | 3/2005 | Lee et al. | |
| 2005/0117639 A1 | 6/2005 | Turaga et al. | |

(Continued)

FOREIGN PATENT DOCUMENTS

| | | |
|---|---|---|
| WO | WO2006006764 A1 | 1/2006 |
| WO | WO2006006778 A1 | 1/2006 |

(Continued)

OTHER PUBLICATIONS

PCT Search Report for Patent Application No. 2007015212 Mailed on Dec. 20, 2007, pp. 7.

(Continued)

*Primary Examiner* — Tung Vo
(74) *Attorney, Agent, or Firm* — Steve Wight; Sandy Swain; Micky Minhas

(57) ABSTRACT

Video data for a high resolution image unit is coded with regard to both a low resolution reference image unit and a high resolution reference image unit. In an example encoding implementation, both low pass information and high pass information of residue data for a current image are generated. In an example decoding implementation, a current image is reconstructed by synthesizing both low pass information and high pass information for the reconstructed image.

19 Claims, 10 Drawing Sheets

(56) References Cited

U.S. PATENT DOCUMENTS

| | | | |
|---|---|---|---|
| 2005/0117647 A1 | 6/2005 | Han | |
| 2005/0169549 A1 | 8/2005 | Cha et al. | |
| 2005/0195900 A1 | 9/2005 | Han | |
| 2006/0012680 A1 | 1/2006 | Bourge | |
| 2006/0013313 A1 | 1/2006 | Han et al. | |
| 2006/0062298 A1* | 3/2006 | Park et al. | 375/240.12 |
| 2006/0114993 A1 | 6/2006 | Xiong et al. | |
| 2006/0222083 A1* | 10/2006 | Klein Gunnewiek | 375/240.29 |
| 2006/0262860 A1* | 11/2006 | Chou et al. | 375/240.24 |
| 2007/0009050 A1* | 1/2007 | Wang et al. | 375/240.29 |
| 2007/0025448 A1* | 2/2007 | Cha et al. | 375/240.24 |
| 2007/0223582 A1* | 9/2007 | Borer | 375/240.12 |
| 2007/0253487 A1 | 11/2007 | Kim et al. | |

FOREIGN PATENT DOCUMENTS

| | | |
|---|---|---|
| WO | WO2006040793 | 4/2006 |
| WO | WO2006044370 | 4/2006 |
| WO | WO2006059847 A1 | 6/2006 |

OTHER PUBLICATIONS

Luo et al., "Layer-correlated Motion Estimation and Motion Vector Coding for the 3D-Wavelet Video Coding", IEEE 2003, Aug. 2003, 4 pgs.

Benzler, "Spatial Scalable Video Coding Using a Combined Sub-band-DCT Approach", IEEE Transactions on Circuits and Systems for Video Technology, vol. 10, No. 7, Oct. 2000, pp. 1080-1087.

Danyali, et al., "Flexible, highly scalable, object-based wavelet image compression algorithm for network applications," IEEE Proc.-Vis. Image Signal Process., vol. 151, No. 6, Dec. 2004, pp. 498-510.

Taubman, et al., "Highly Scalable Video Compression With Scalable Motion Coding", 4 pages.

Wee, et al., "Secure Scalable Video Streaming for Wireless Networks", IEEE International Conference on Acoustics, Speech, and Signal Processing, May 2001, 4 pages.

Mandal, Video Segmentation in the Wavelet Compressed Domain, Journal of Visual Communications and Image Representation, 2001, pp. 12, 17-28.

Non-Final Office Action for U.S. Appl. No. 12/503,582, mailed on Oct. 6, 2011, Shipeng Li, "Barbell Lifting for Wavelet Coding", 5 pages.

* cited by examiner

Encoding Process

SPATIALLY SCALABLE VIDEO CODING

BACKGROUND

Video may be displayed on many different types of electronic devices. Example electronic device types include televisions, computer monitors, personal entertainment appliances (e.g., portable game machines, portable video players, etc.), mobile phones, and so forth. These different types of electronic devices have an equally diverse variety of screen resolutions that they are capable of displaying.

Video data may be distributed using some type of transmission media. Example transmission media types include cable, digital subscriber line (DSL), the internet, cellular wireless links, local or wide area networks, Ethernet networks, and so forth. These different types of transmission media have an equally diverse number of bandwidths that they are capable of providing.

Video data is often compressed in accordance with some coding algorithm to enable its transmission over communication links having a limited bandwidth. Example coding algorithms include Moving Pictures Expert Group (MPEG)-2 and MPEG-4. Some of these coding algorithms are capable of coding the same video data in different manners so that it may be transmitted at different bandwidths.

SUMMARY

Video data for a high resolution image unit is coded with regard to both a low resolution reference image unit and a high resolution reference image unit. In an example encoding implementation, both low pass information and high pass information of residue data for a current image are generated. In an example decoding implementation, a current image is reconstructed by synthesizing both low pass information and high pass information for the reconstructed image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Example Principles

In conventional approaches to video coding with spatial scalability, the coding of a higher resolution layer either uses inter-frame prediction or inter-layer prediction, but they are all relatively inefficient because they do not employ these two predictions simultaneously.

In contrast, an example motion compensation framework as described herein for multiple resolution layers can more efficiently code the higher resolution layer(s). In a described implementation, each frame at the higher resolution is decomposed into low-pass signals that represent the low resolution video and high-pass signals. Each resolution layer uses motion compensation to exploit the redundancy within the layer itself. For the low-pass signals, traditional image-domain motion compensation may be used. But for the high-pass signals, high-pass decomposition is used for the motion prediction with the current frame to determine high-pass prediction and high-pass original signals before compensation. Image decomposition and motion compensation at each resolution layer can enable the simultaneous efficient exploitation of both the inter-layer redundancy and the inter-frame redundancy.

In an example described implementation, a video coder codes a current image unit at a given resolution level using prediction data determined at the given resolution level and prediction data determined at a lower resolution level. More specifically, the prediction data determined at the lower resolution level may be determined from low pass information for a reference image having a time that corresponds to a time of the current image unit, and/or the prediction data determined at the given resolution level may be determined from a reference image having a time that differs from a time of the current image unit.

Figure 1:
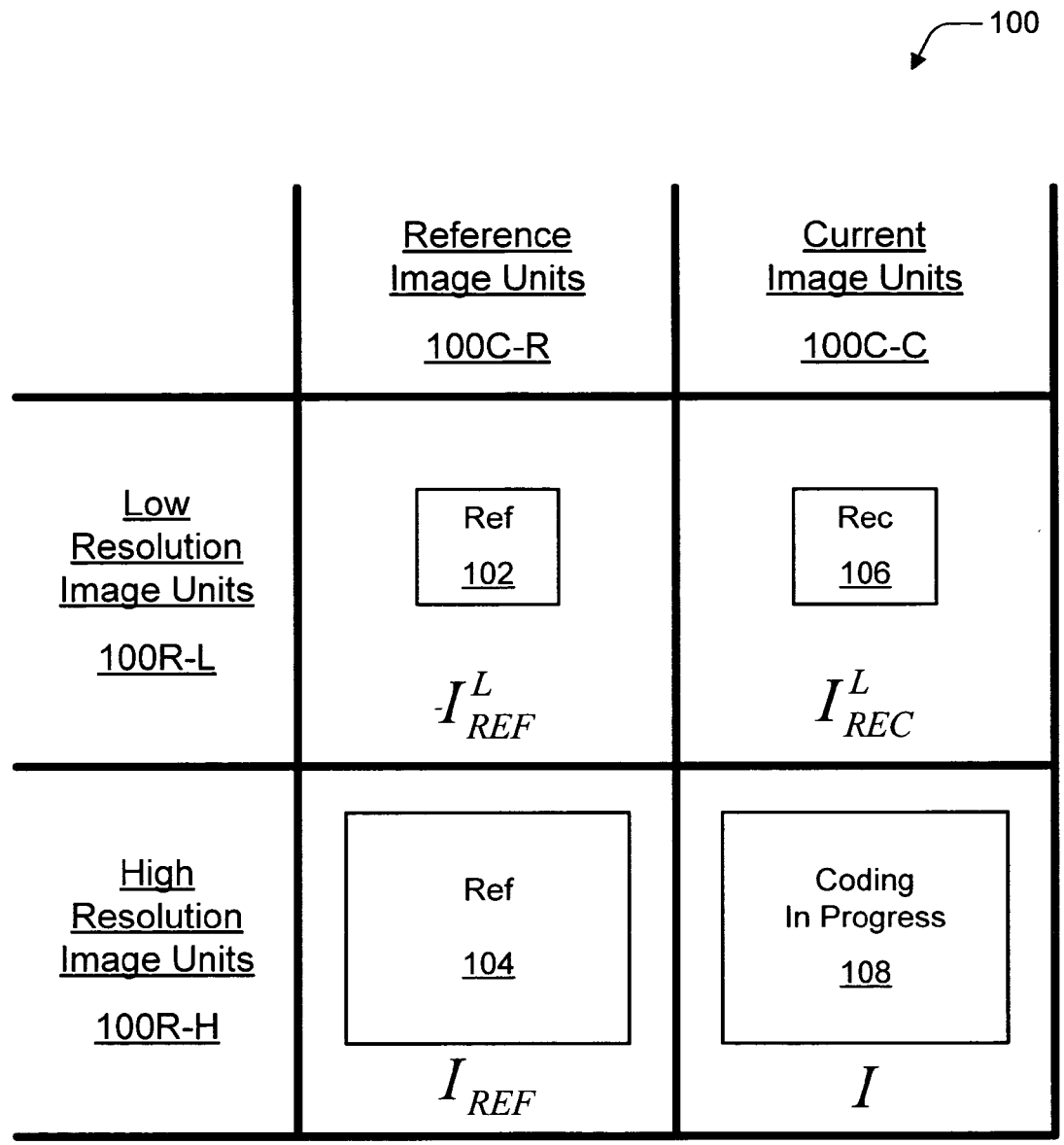
FIG. 1 is an example matrix that illustrates image units at different times versus image units at different resolution levels.

FIG. 1 is an example matrix 100 that illustrates image units at different times versus image units at different resolution levels. Matrix 100 includes two columns 100C that are directed to reference and current image units and two rows 100R that are directed to low and high resolution image units. A first column 100C-R includes reference image units, and a second column 100C-C includes current image units. A first row 100R-L includes low resolution image units, and a second row 100R-H includes high resolution image units.

Matrix 100 includes four image units: $I_{REF}^{L}$, $I_{REF}$, $I_{REC}^{L}$, and I. The $I_{REF}^{L}$ is a low resolution reference image unit 102. The $I_{REC}^{L}$ is a low resolution current image unit 106. The $I_{REF}$ is a high resolution reference image unit 104. The I is a high resolution current image unit 108. The coding is to be performed or is in-progress for high resolution current image unit 108. The image units may represent any definable area or amount of an image. Example image units include, but are not limited to, frames, macroblocks, and so forth.

In layered coding schemes that support spatial resolution scalability, input video frames are down-sampled and coded at each resolution. The following example pertains to a high resolution coding scenario. It is given that at a certain coding instance there are two previously-reconstructed reference images: $I_{REF}^L$ 102 at a low resolution and $I_{REF}$ 104 at a high resolution. There is also a reconstruction image unit of the current frame at low resolution $I_{REC}^L$ 106. A goal of an example spatial-scalable coding scheme implementation as described herein is to code the high resolution current image frame I 108 efficiently, based on the information already coded in $I_{REF}^L$, $I_{REF}$, and $I_{REC}^L$.

With existing spatial scalable coding schemes, the high resolution frame to be coded is either (i) predicted from the reconstructed low-resolution image of the same frame or (ii) predicted from the previously-coded reference frames at the same resolution (e.g., at the high resolution). In other words, existing techniques are relatively inefficient because they fail to combine the two prediction sources.

In contrast, implementations for spatially-scalable video coding as described herein enable high-resolution image frame prediction from both (i) the reconstructed low-resolution image of the same frame and (ii) at least one of the previously-coded reference frames at the same resolution (e.g., at the high resolution). For example, the prediction for a high resolution frame may be accomplished by using a prediction for low pass content from the lower resolution of the current frame and a prediction for high pass content from the reference(s) at the high resolution of different frame(s). Low resolution prediction and high resolution prediction may therefore be combined in an efficient manner to achieve a better overall prediction. Consequently, each bit that is coded at the lower resolution can efficiently contribute to the higher resolution coding.

Figure 2:
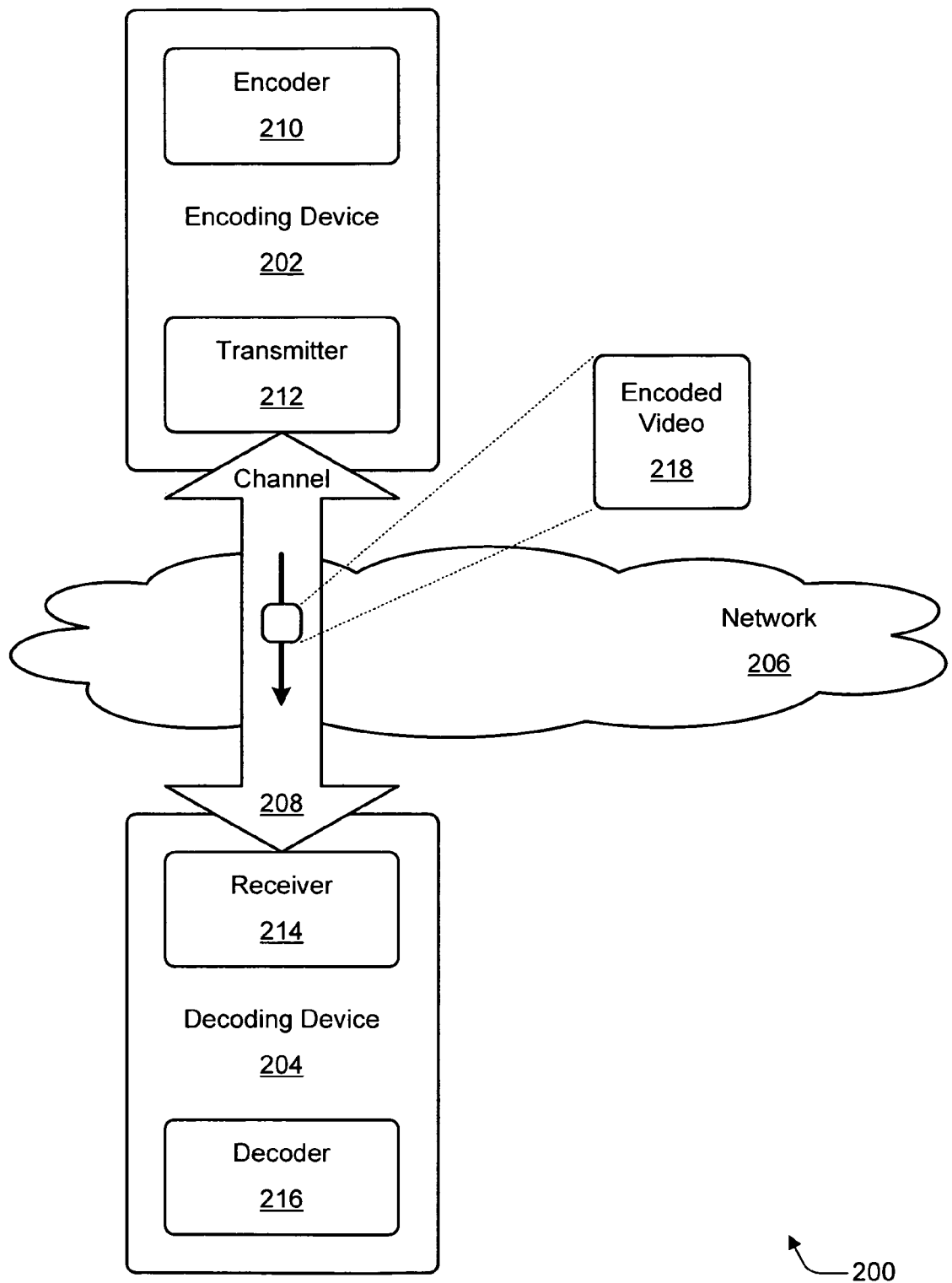
FIG. 2 is a block diagram that illustrates an example general environment in which spatially-scalable video coding may be implemented.

FIG. 2 is a block diagram that illustrates an example general environment 200 in which spatially-scalable video coding may be implemented. An encoding device 202 is in communication with a decoding device 204 over one or more networks 206 via at least one channel 208. As illustrated, encoding device 202 includes an encoder 210 and a transmitter 212. Decoding device 204 includes a receiver 214 and a decoder 216. A coding device may comprise an encoding device 202 and/or a decoding device 204.

In a described implementation, a coding device is any electronic device that is capable of encoding and/or decoding video data. At least some coding devices are capable of directly or indirectly displaying video data on a display screen that is either integrated with or separate from the coding device. Examples of coding devices include, but are not limited to, computers (e.g., a client, a server, a personal computer, a workstation, a desktop, a laptop, etc.), televisions, game machines (e.g., a console, a portable game device, etc.), set-top boxes, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 10.

Network 206 may be formed from any one or more networks that are linked together and/or overlaid on top of each other. Examples of networks 206 include, but are not limited to, an internet, a telephone network, an Ethernet, a local area network (LAN), a wide area network (WAN), a cable network, a fibre network, a digital subscriber line (DSL) network, a cellular network, a Wi-Fi network, a WiMAX network, a virtual private network (VPN), some combination thereof, and so forth.

Channel 208 is established between transmitter 212 of encoding device 202 and receiver 214 of decoding device 204. Channel 208 may be any physical or other network layer that enables communication over network 206. During operation, transmitter 212 sends encoded video 218 to receiver 214. Authentications, handshaking, verifications, acknowledgments, etc. between the two communication endpoints result in some two-way data exchange across channel 208. Examples of what encoded video 218 may comprise are provided herein below.

Although illustrated differently, each of encoding device 202 and decoding device 204 may have both a transmitter 212 and a receiver 214, including a joint transceiver (not explicitly shown). Similarly, each of encoding device 202 and decoding device 204 may have both a video encoder 210 and a video decoder 216. A video coder (not explicitly shown) may include an encoder 210 and/or a decoder 216. Example encoding processes are described herein below with particular reference to FIGS. 5 and 7. Example decoding processes are described herein below with particular reference to FIGS. 6 and 8.

Example Implementations

Figure 3:
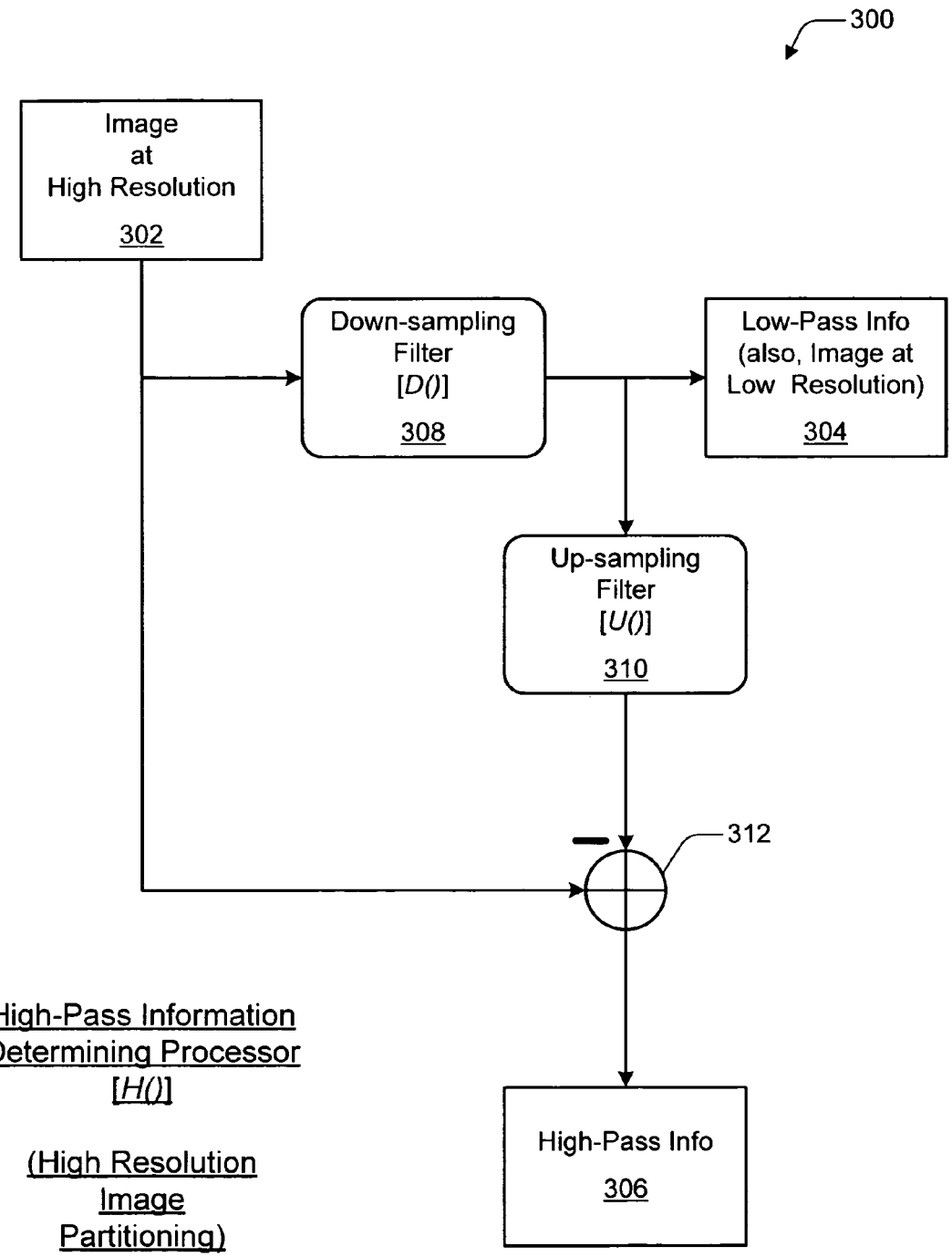
FIG. 3 is a block diagram of an example high pass information determining processor [H( )].
Figure 4:
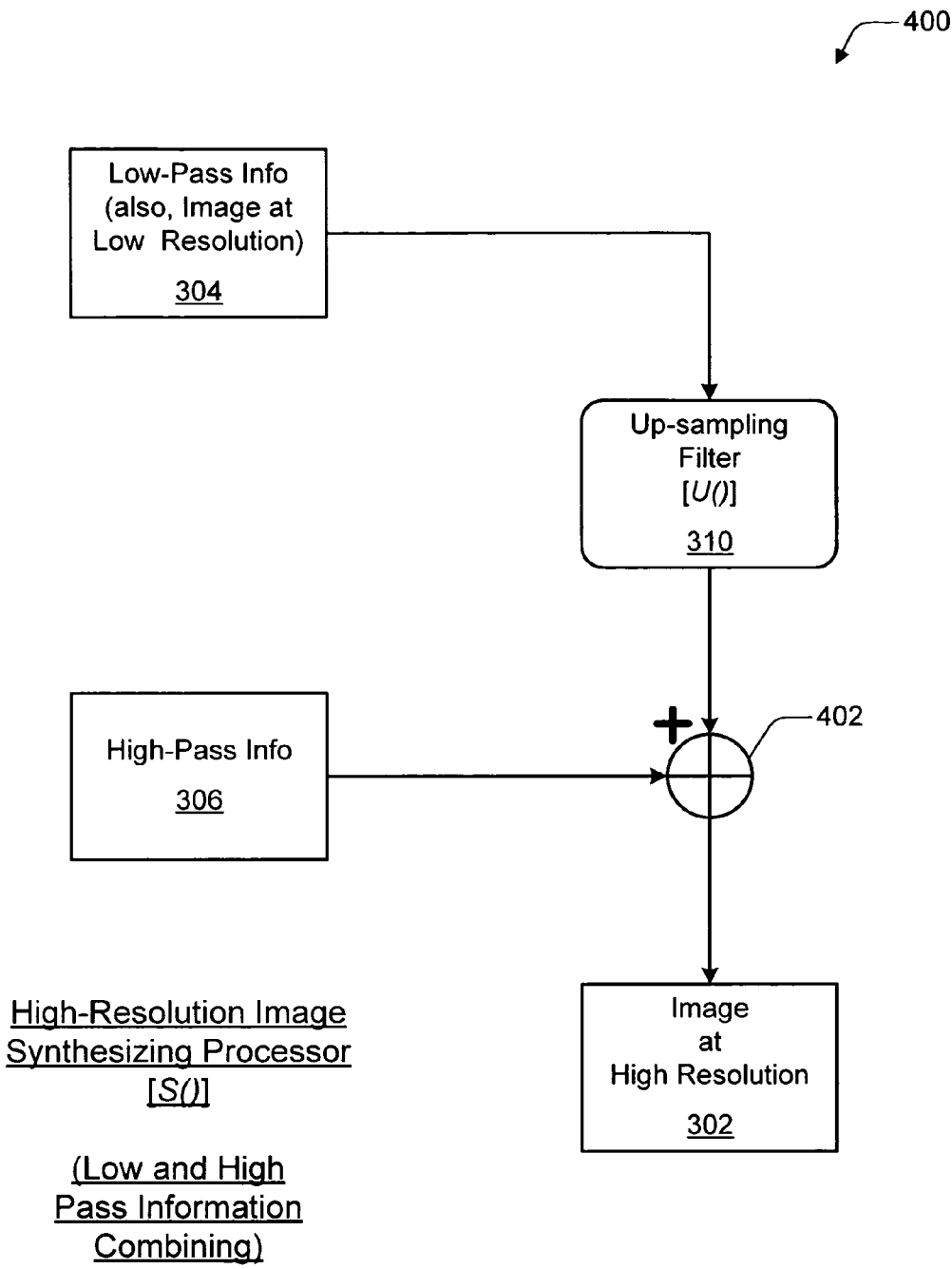
FIG. 4 is a block diagram of an example high resolution image synthesizing processor [S( )].
Figure 5:
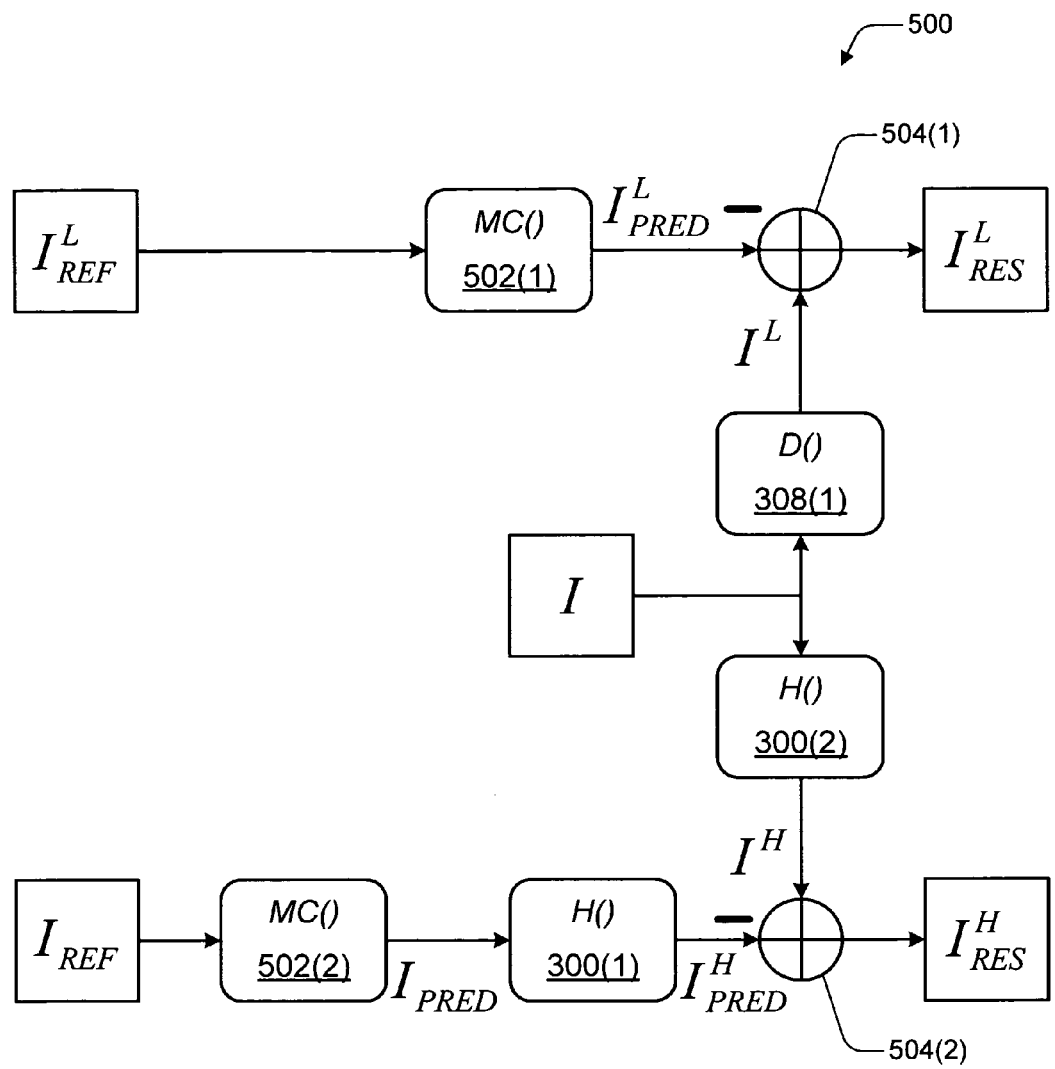
FIG. 5 is a block diagram of an example encoding process that results in low pass information of residue data and high pass information of residue data.
Figure 6:
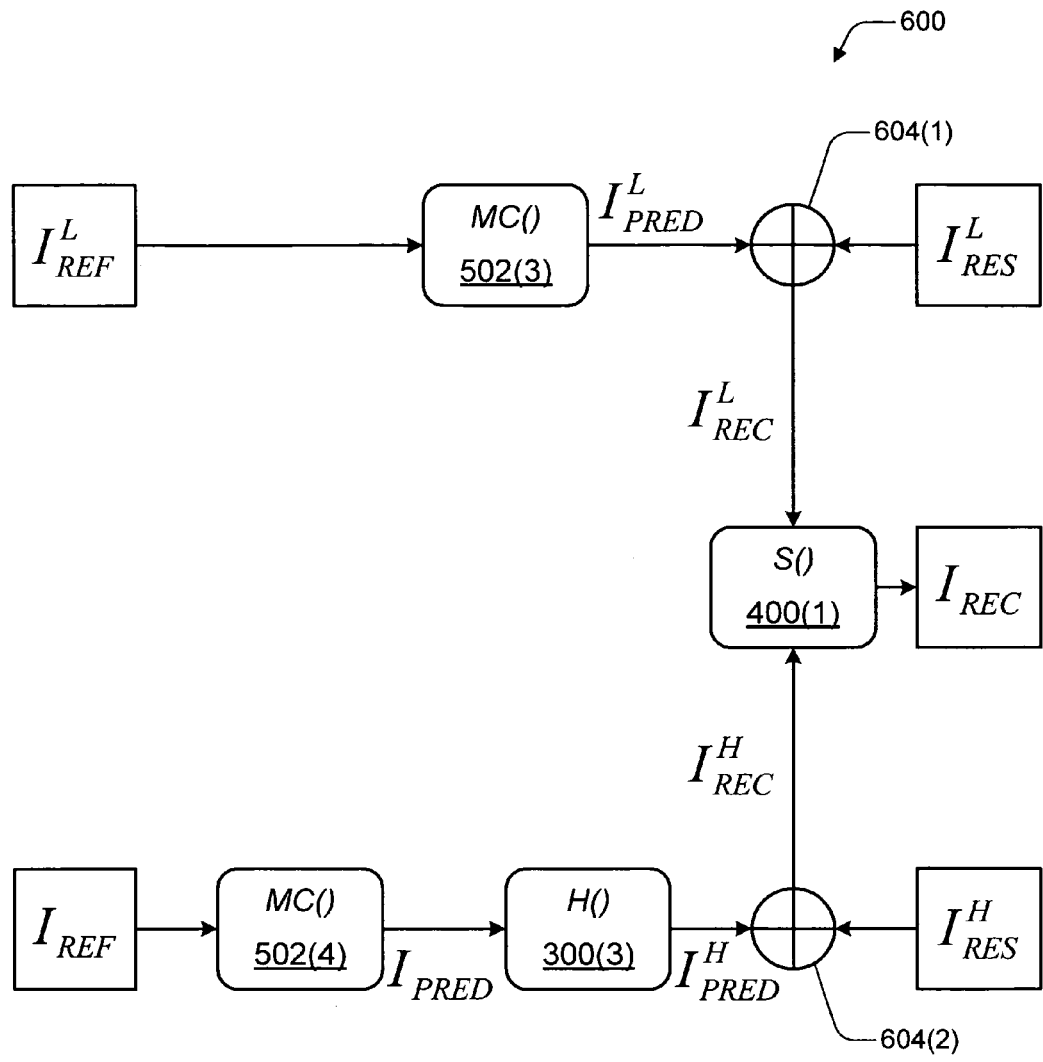
FIG. 6 is a block diagram of an example decoding process that reproduces an image unit from low pass information of residue data and high pass information of residue data.
Figure 7:
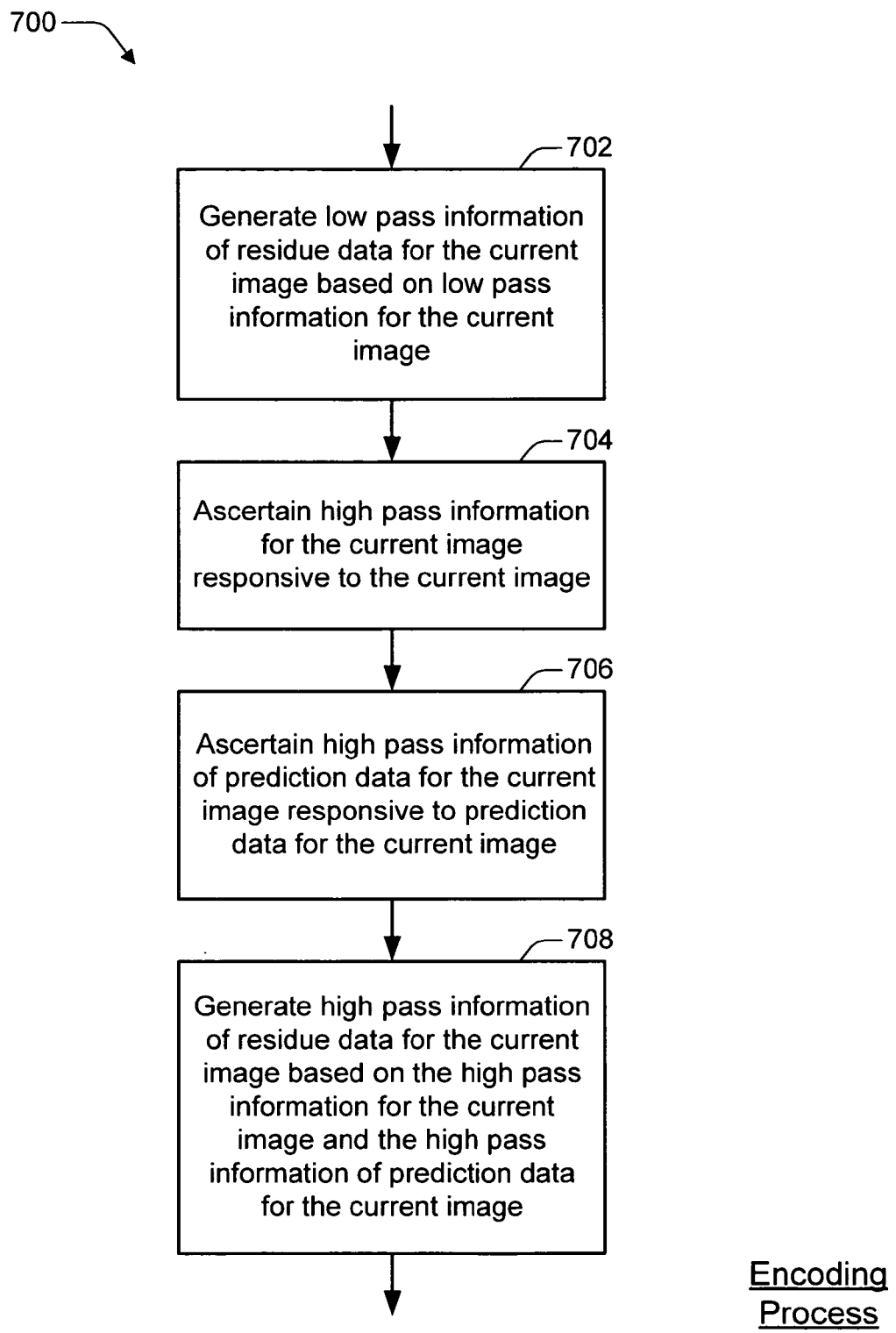
FIG. 7 is a flow diagram that illustrates an example of a method for encoding video data.
Figure 8:
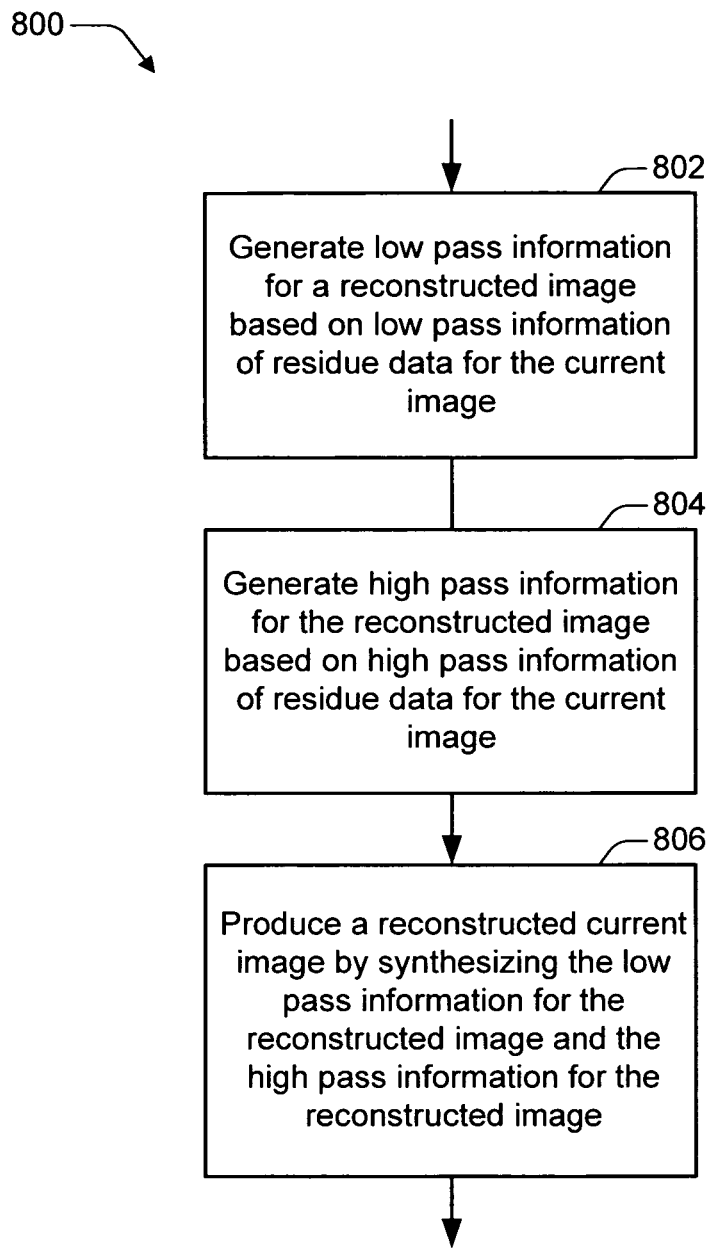
FIG. 8 is a flow diagram that illustrates an example of a method for decoding video data.

FIGS. 3 and 4 illustrate the interrelationships between an image at high resolution, the image at low resolution, low-pass information, high-pass information, a down-sampling filter [D( )], an up-sampling filter [U( )], a high-pass information determining processor [H( )], and a high-resolution image synthesizing processor [S( )]. FIGS. 5 and 6 illustrate encoding and decoding processes, respectively, from a component perspective. FIGS. 7 and 8 illustrate encoding and decoding processes, respectively, from a flowchart perspective.

FIG. 3 is a block diagram of an example high-pass information determining processor [H( )] 300. This processor H( ) effectively partitions the high-resolution image. As illustrated, high-pass information determining processor [H( )] 300 includes an image at high resolution 302, low-pass information 304, and high-pass information 306. Low-pass information 304 is also the image at a low resolution.

High-pass information determining processor [H( )] 300 also includes a mixing operation 312 and two filters: down-sampling filter [D( )] 308 and up-sampling filter [U( )] 310. Both down-sampling filter DO and up-sampling filter U( ) may be realized using traditional down and up-sampling filters, respectively, which involve relatively mature technology.

In a described implementation, the high-pass information determining process operates as follows. The image at high resolution 302 is applied to down-sampling filter [D( )] 308. The down-sampling of high-resolution image 302 creates low-pass information 304. This low-pass information 304 also comprises the image at a lower resolution and may be coded and displayed as such.

Low-pass information 304 is applied to up-sampling filter [U( )] 310 to create up-sampled low-pass information (not explicitly shown in FIG. 3). Mixing operation 312 of high-pass information determining processor H( ) ascertains high-pass information 306. More specifically, the output of up-sampling filter [U( )] 310, which is the up-sampled low-pass information, is subtracted from high-resolution image 302 to ascertain high-pass information 306, which is the difference between the two.

FIG. 4 is a block diagram of an example high-resolution image synthesizing processor [S( )] 400. This processor S( ) effectively combines the low-pass information and the high-pass information to reconstruct high resolution image. As illustrated, high-resolution image synthesizing processor [S( )] 400 includes low-pass information 304, high-pass information 306, and image at high resolution 302. High-resolution image synthesizing processor [S( )] 400 also includes a combination operation 402 and one filter: up-sampling filter [U( )] 310.

In a described implementation, the high-resolution image synthesizing process operates as follows. Low-pass information 304 is applied to up-sampling filter [U( )] 310 to create up-sampled low-pass information (not explicitly shown in FIG. 4). Combination operation 402 of synthesizing processor S( ) produces image at high resolution 302. More specifically, the output of up-sampling filter [U( )] 310, which is the up-sampled low-pass information, is added to high-pass information 306 to produce high-resolution image 302. As is more apparent from the description of FIG. 6 below, the low-pass information 304 and the high-pass information 306 that are input to the synthesizing process S( ) are reconstructed versions thereof.

The interrelationships between an image at high resolution, the image at low resolution, low-pass information, high-pass information, a down-sampling filter [D( )], an up-sampling filter [U( )], a high-pass information determining processor [H( )], and a high-resolution image synthesizing processor [S( )] are described quantitatively below. Although the principles may be applied equally effectively to any image unit, the quantitative description herein refers to image frames for the sake of clarity.

In this mathematical analysis, the current frame to be coded is denoted as I. Given a low-pass filter, the low resolution image of I can be created via a down-sampling process D( ):

$$I^L = D(I), \qquad (1)$$

where $I^L$ is the low resolution image. This low resolution image contains low-pass information of the original image I. D( ) is a down-sampling process. Correspondingly, the low-pass information $I^L$ can be up-sampled back to the original resolution. Let U( ) denote an up-sampling process.

The high-pass information $I^H$ of the original image I can then be ascertained by process H( ):

$$\underline{\Delta} H(I): I^H = I - U(I^L) = I - U(D(I)) \qquad (2)$$

Hence, by determining two filter processes, D( ) and U( ), the image can be partitioned or decomposed into a low-pass part $I^L$ and a high-pass part $I^H$. Given these two information parts, the original image I can be recovered losslessly by synthesizing process S( ):

$$\underline{\Delta} S(I^L, I^H): I = U(I^L) + I^H \qquad (3)$$

FIG. 5 is a block diagram of an example encoding process 500 that results in low pass information of residue data $I_{RES}^L$ and high pass information of residue data $I_{RES}^H$. Encoding process 500 may be performed in encoder 210 of encoding device 202 (of FIG. 2). As illustrated, encoding process 500 includes a number of operation blocks (denoted as rounded rectangles or crossed circles) and a number of image unit blocks (denoted with squares).

Encoding process 500 includes the following operation blocks: motion compensation MC( ) operations 502(1) and 502(2), down-sampling filter D( ) operation 308(1), high-pass information determination processor H( ) operation 300(1) and 300(2), and mixing operations 504(1) and 504(2). Encoding process 500 includes the following image units: current image I, reference image $I_{REF}$, low pass information for reference image $I_{REF}^L$, prediction data $I_{PRED}$, low pass information of prediction data $I_{PRED}^L$, high pass information of prediction data $I_{PRED}^H$, low pass information for current image $I^L$, high pass information for current image $I^H$, low pass information of residue data $I_{RES}^L$, and high pass information of residue data $I_{RES}^H$.

The reference image unit(s) may be from any reference image. By way of example only for an MPEG implementation, reference image unit(s) may be from an infra (I) image unit, a predicted (P) image unit, a bi-directional (B) image unit, and so forth. The motion compensation of MC( ) operations 502 may be performed in accordance with traditional motion compensation techniques, which is a relatively mature technology.

In a described implementation, current image I is applied to down-sampling filter D( ) 308(1) to create low pass information for current image $I^L$. Low pass information for current image $I^L$ is part of mixing operation 504(1). Low pass information for reference image $I_{REF}^L$ is applied to motion compensation MC( ) operation 502(1) to determine low pass information of prediction data $I_{PRED}^L$.

Low pass information of residue data $I_{RES}^L$ is generated from mixing operation 504(1). More specifically, in mixing or difference operation 504(1), low pass information of prediction data $I_{PRED}^L$ is subtracted from low pass information for current image $I^L$ to generate low pass information of residue data $I_{RES}^L$, which is the difference between the two. In this context, "subtracted from" implies that mixing operations 504 effectively remove from the main low or high pass image unit information the image information that is contained in the low or high pass information of the predicted data, respectively.

Current image I is also applied to high-pass determining processor H( ) 300(2) to ascertain high pass information for current image $I^H$. High pass information for current image $I^H$ is part of mixing operation 504(2).

Reference image $I_{REF}$ is applied to motion compensation MC( ) operation 502(2) to determine prediction data $I_{PRED}$. Prediction data $I_{PRED}$ is applied to high-pass information determining processor H( ) 300(1) to ascertain high pass information of prediction data $I_{PRED}^H$.

High pass information of residue data $I_{RES}^H$ is generated from mixing operation 504(2). More specifically, in mixing or difference operation 504(2), high pass information of prediction data $I_{PRED}^H$ is subtracted from high pass information for current image $I^H$ to generate high pass information of residue data $I_{RES}^H$, which is the difference between the two.

With reference to FIG. 2, encoding device 202 may transmit low pass information of residue data $I_{RES}^L$ and high pass information of residue data $I_{RES}^H$ over channel 208 to decoding device 204. Decoding device 204 may then perform a decoding process as described below with particular reference to FIG. 6.

FIG. 6 is a block diagram of an example decoding process 600 that reproduces an image unit from low pass information of residue data $I_{RES}^L$ and high pass information of residue data $I_{RES}^H$. Decoding process 600 may be performed in decoder 216 of decoding device 204 (of FIG. 2). As illustrated, decoding process 600 includes a number of operation blocks (denoted as rounded rectangles or crossed circles) and a number of image unit blocks (denoted with squares).

Decoding process 600 includes the following operation blocks: motion compensation MC( ) operations 502(3) and 502(4), high-pass information determination processor H( ) operation 300(3), high-resolution image synthesizing processor S( ) operation 400(1), and combination operations 604(1) and 604(2). Decoding process 600 includes the following image units: reference image $I_{REF}$, low pass information for reference image $I_{REF}^L$, prediction data $I_{PRED}$, low pass information of prediction data $I_{PRED}$, high pass information of prediction data $I_{PRED}^H$, low pass information of residue data $I_{RES}^L$, high pass information of residue data $I_{RES}^H$, low pass information for reconstructed image $I_{REC}^L$, high pass information for reconstructed image $I_{REC}^H$, and reconstructed current image $I_{REC}$.

In a described implementation, low pass information for reference image $I_{REF}^L$ is applied to motion compensation MC( ) operation 502(3) to determine low pass information of prediction data $I_{PRED}^L$. Low pass information of prediction data $I_{PRED}^L$ and low pass information of residue data $I_{RES}^L$ are combined (e.g., added) with combination operation 604(1) to generate low pass information for reconstructed image $I_{REC}^L$. Low pass information for reconstructed image $I_{REC}^L$ is applied to high-resolution image synthesizing processor S( ) operation 400(1).

Reference image $I_{REF}$ is applied to motion compensation MC( ) operation 502(4) to determine prediction data $I_{PRED}$. Prediction data $I_{PRED}$ is applied to high-pass information determining processor H( ) 300(3) to ascertain high pass information of prediction data $I_{PRED}^H$. High pass information of prediction data $I_{PRED}^H$ and high pass information of residue data $I_{RES}^H$ are combined (e.g., added) with combination operation 604(2) to generate high pass information for reconstructed image $I_{REC}^H$. High pass information for reconstructed image $I_{REC}^H$ is also applied to high-resolution image synthesizing processor S( ) operation 400(1).

Thus, low pass information for reconstructed image $I_{REC}^L$ and high pass information for reconstructed image $I_{REC}^H$ are both applied to high-resolution image synthesizing processor S( ) operation 400(1). From these two inputs, high-resolution image synthesizing processor S( ) operation 400(1) produces reconstructed current image $I_{REC}$. Hence, the high-resolution reconstructed current image $I_{REC}$ is produced using predictions from both the current low pass information for reference image $I_{REF}^L$ and a reference image $I_{REF}$ at the high resolution.

In a more specific example implementation, high-resolution image synthesizing processor S( ) operation 400(1) (of FIG. 6) corresponds to high-resolution image synthesizing processor [S( )] 400 of FIG. 4 as well as equation (3) above. Consequently, low pass information for reconstructed image $I_{REC}^L$ is up-sampled by up-sampling filter [U( )] 310 (of FIG. 4) to create up-sampled information for the reconstructed image. This up-sampled information for the reconstructed image is combined with high pass information for reconstructed image $I_{REC}^H$ in a combination operation 402 to produce reconstructed current image $I_{REC}$.

The relatively-quantitative example mathematical analysis that was introduced above is continued here with reference to the operation blocks and image units of FIGS. 5 and 6. It is given that there are two resolutions of reference images: $I_{REF}^L$ and $I_{REF}$, which correspond to $I^L$ and I, respectively. Certain described implementations of spatially-scalable video coding generate difference signals to be coded based on these two references.

For the low resolution image $I^L$, the prediction image $I_{PRED}^L$ may be generated in accordance with traditional motion compensation:

$$I_{PRED}^L = MC(I_{REF}^L, MVs^L), \quad (4)$$

where MC( ) is a motion compensation process and $MVs^L$ denotes the motion field for the low resolution. The difference signal or residue to be coded for the low resolution is:

$$I_{RES}^L = I^L - I_{PRED}^L. \quad (5)$$

For the high resolution image I, because the low-pass part, which corresponds to the low resolution image $I^L$, has already been motion compensated, the prediction can be focused on the high-pass part. Prediction data need not be generated for the whole high resolution image. (This reduces, if not eliminates, the redundancy in traditional approaches that exists between the motion compensation of the low resolution and that of high resolution because the low-pass part of the image is also motion compensated in the motion compensation processes of all resolutions.)

For the high resolution image I, the prediction data is first determined by:

$$I_{PRED} = MC(I_{REF}, MVs), \quad (6)$$

where MVs denotes the motion field for the high resolution image, which is not necessarily the same as $MVs^L$. The residue image $I_{RES}$ to be coded for the high resolution is:

$$I_{RES} = H(I) - H(I_{PRED}) \quad (7)$$

or $$I_{RES} = I - U(I^L) - H(I_{PRED}). \quad (8)$$

Equation (8), by relying on equation (2) above, indicates that the residue image $I_{RES}$ to be coded is generated by subtracting the up-sampled low resolution image $I^L$ and the high-pass information of prediction data for the current image $H(I_{PRED})$ from the high-resolution image I.

Furthermore, when the low resolution's reconstruction image $I_{rec}^L$ is available, it can be substituted for the low resolution image $I^L$ in equation (8) so that any mismatch between the encoder and the decoder can be decreased. This is because both the encoder and the decoder have the reconstructed version of the low pass information for image $I_{rec}^L$, but the decoder does not have access to the original low pass information for the current image $I^L$. Hence, the residue may be generated by the following equation (9) when the low resolution's reconstruction information $I_{rec}^L$ is available:

$$I_{RES} = I - U(I_{rec}^L) - H(I_{PRED}). \quad (9)$$

As noted above, there are at least two approaches to applying the spatially-scalable video coding. These two approaches are: on a frame level and on a macroblock level. With either approach, low resolution video may be coded using traditional video coding. In a frame-based scheme, equation (8) or (9) is employed for the whole frame. In a macroblock based scheme, equation (8) or (9) is employed for the current macroblock.

According to equation (2), H( ) can be ascertained by using both up-sampling and down-sampling filters, which also ultimately makes H( ) a filter, too. However, it may in practice result in the filter of H( ) having too long of taps, which increases the computational complexity. In general, equation (9) can be further generalized into:

$$I_{RES} = I - U(I_{rec}^L) - f * I_{PRED}, \quad (10)$$

where f is a filter and * denotes convolution. The taps of filter f can be acquired by minimizing the energy of the residue signals given a constraint of the number of taps of filter f.

FIG. 7 is a flow diagram 700 that illustrates an example of a method for encoding video data. Flow diagram 700 includes four (4) blocks 702-708. Although the actions of flow diagram 700 may be performed in other environments and with a variety of hardware and software combinations, the features of FIGS. 2-6 are used to illustrate an example of the method. For example, a video coder (e.g., a video encoder 210 (of FIG. 2)) may implement the actions of flow diagram 700.

At block 702, low pass information of residue data for the current image is generated based on low pass information for the current image. This generation may be accomplished, for example, using mixing operation 504(1) and low pass information of prediction data.

At block 704, high pass information for the current image is ascertained responsive to the current image. For example, the high pass information for the current image may be ascertained with a down-sampling filter [D( )] 308, an up-sampling filter [U( )] 310, and a mixing operation 312 as part of a high-pass information determining processor [H( )] 300(2).

At block 706, high pass information of prediction data for the current image is ascertained responsive to prediction data for the current image. This ascertainment may be accomplished using, for example, a high-pass information determining processor [H( )] 300(1).

At block 708, high pass information of residue data for the current image is generated based on the high pass information for the current image and the high pass information of prediction data for the current image. For example, the high pass information of residue data for the current image may be generated using mixing operation 504(2) by taking away the high pass information of prediction data for the current image from the high pass information for the current image.

FIG. 8 is a flow diagram that illustrates an example of a method for decoding video data. Flow diagram 800 includes three (3) blocks 802-806. Although the actions of flow diagram 800 may be performed in other environments and with a variety of hardware and software combinations, the features of FIGS. 2-6 are used to illustrate an example of the method. For example, a video coder (e.g., a video decoder 216 (of FIG. 2)) may implement the actions of flow diagram 800.

At block 802, low pass information for a reconstructed image is generated based on low pass information of residue data for the current image. For example, the low pass information for a reconstructed image may be generated in a combination operation 604(1) with low pass information of residue data for the current image and low pass information of prediction data.

At block 804, high pass information for the reconstructed image is generated based on high pass information of residue data for the current image. For example, the high pass information for a reconstructed image may be generated in a combination operation 604(2) with high pass information of residue data for the current image and high pass information of prediction data.

At block 806, a reconstructed current image is produced by synthesizing the low pass information for the reconstructed image and the high pass information for the reconstructed image. A reconstructed current image may be produced, for example, in a high-resolution image synthesizing processor [S( )] 400(1).

Figure 9:
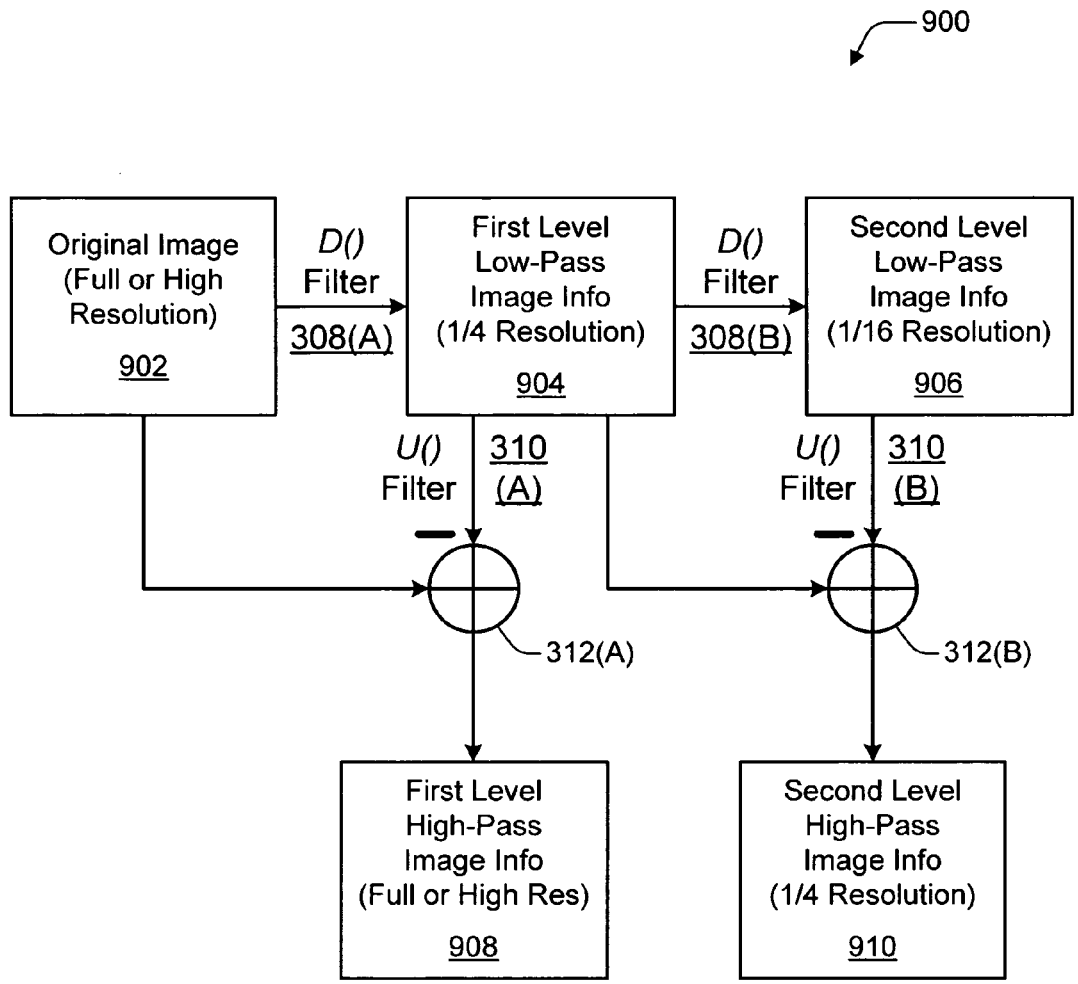
FIG. 9 is a block diagram illustrating spatially-scalable video coding as applied to multiple resolution levels.

FIG. 9 is a block diagram 900 illustrating spatially-scalable video coding as applied to multiple resolution levels. Block diagram 900 illustrates an original image 902 being decomposed or partitioned into two lower resolutions 904 and 906. Original image 902 is at a full or high resolution level.

Application of de-sampling filter D( ) 308(A) creates first level low-pass image information 904. De-sampling (and up-sampling) may be performed at any ratio. However, in the example of block diagram 900, the ratio is ¼. Hence, first level low-pass image information 904 is at ¼ the resolution level of the full resolution image original image 902.

Application of up-sampling filter U( ) 310(A) creates an up-sampled first level low-pass image information (not explicitly identified in FIG. 9) that is subtracted from full resolution original image 902 in mixing operation 312(A) to ascertain a first level high-pass image information for the full resolution 908.

Continuing with the second resolution decomposition level, first level low-pass image information 904 is down-sampled with D( ) filter 308(B) to create second level low-pass image information 906. Because the example down and up-sampling ratio in this example is ¼, second level low-pass image information 906 has 1/16 the resolution of full resolution original image 902.

Application of up-sampling filter U( ) 310(B) creates an up-sampled second level low-pass image information (not explicitly identified in FIG. 9) that is subtracted from first level low-pass image information 904 in mixing operation 312(B) to ascertain second level high-pass image information 910 for ¼ the full resolution.

In operation, a destination or decoding device 204 can indicate the resolution that it desires (e.g., based on hardware capability, currently-available software resources, an assigned window, etc.). Accordingly, transmitting or encoding device 202 may tailor its transmission of coded video data to correspond to the indicated resolution level. In other words, an originating device may transmit the low pass information of residue data for a current image and the high pass information of residue data for the current image that corresponds to an identified resolution level of a destination device.

For example, if a destination device has 1/16 of the full resolution, the originating device may transmit second level low-pass image information 906, which is also the 1/16-resolution image. If a destination device has a ¼ full resolution capability, the originating device may send second level high-pass image information 910 and second level low-pass image information 906. In this manner, different resolution levels may be handled efficiently without sending the amount of duplicative information that is sent with existing approaches.

Figure 10:
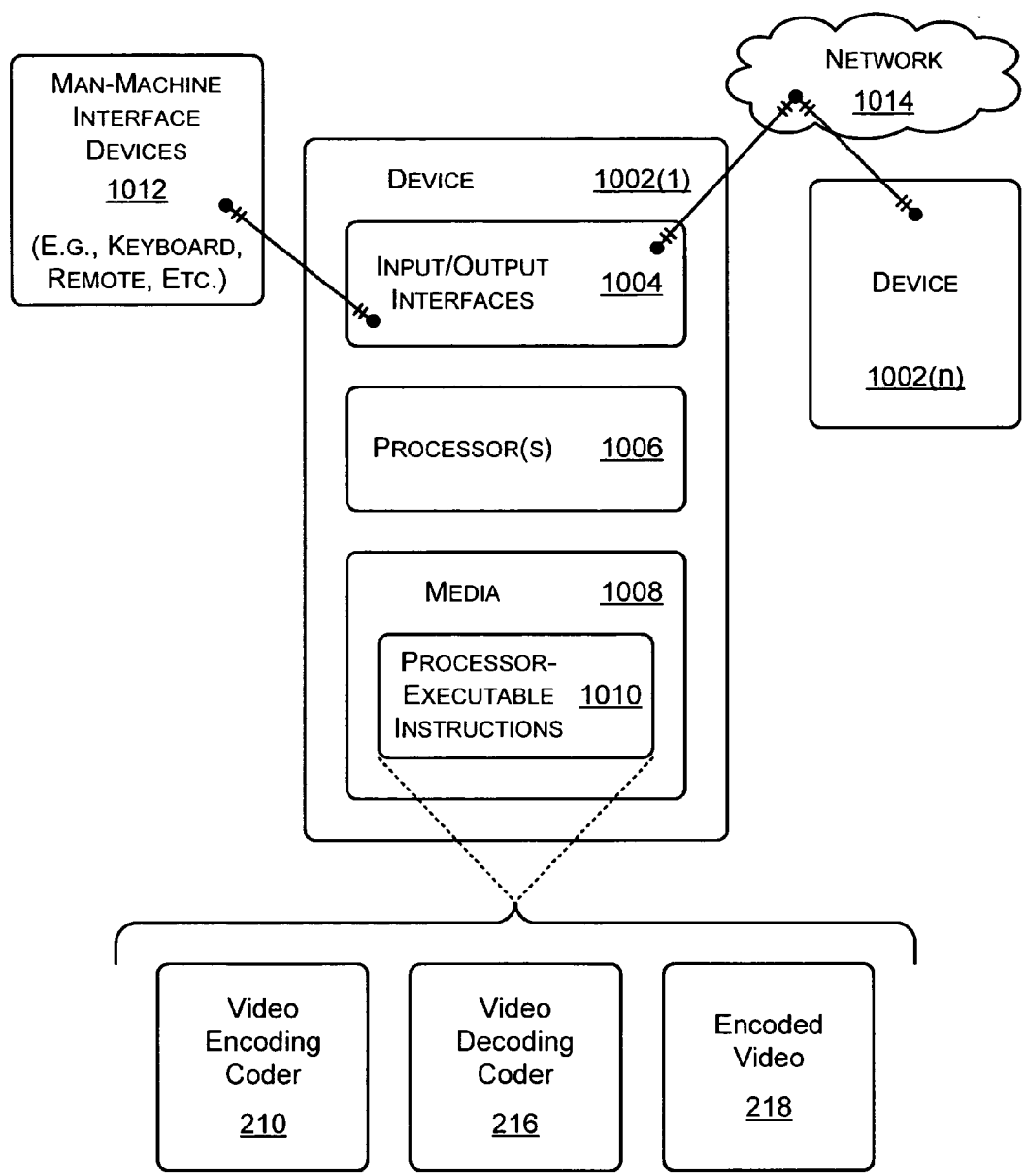
FIG. 10 is a block diagram of an example device that may be used to implement spatially-scalable video coding.

FIG. 10 is a block diagram of an example device 1002 that may be used to implement spatially-scalable video coding. Multiple devices 1002 are capable of communicating across one or more networks 1014, such as a network 206 (of FIG. 2). As illustrated, two devices 1002(1) and 1002(n) are capable of engaging in communication exchanges via network 1014. Although two devices 1002 are specifically shown, one or more than two devices 1002 may be employed, depending on implementation. Encoding devices 202 and decoding devices 204 may be realized as devices 1002.

Generally, a device 1002 may represent any computer or processing-capable device, such as a server device; a workstation or other general computer device; a personal digital assistant (PDA); a mobile phone; a gaming platform; an entertainment device; one of the devices listed above with reference to FIG. 2; some combination thereof; and so forth. As illustrated, device 1002 includes one or more input/output (I/O) interfaces 1004, at least one processor 1006, and one or more media 1008. Media 1008 include processor-executable instructions 1010.

In a described implementation of device 1002, I/O interfaces 1004 may include (i) a network interface for communicating across network 1014, (ii) a display device interface for displaying information on a display screen, (iii) one or more man-machine interfaces, and so forth. Examples of (i) network interfaces include a network card, a modem, one or more ports, and so forth, such as a transmitter 212 or a receiver 214. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 1012 (e.g., a keyboard, a remote, a mouse or other graphical pointing device, etc.).

Generally, processor 1006 is capable of executing, performing, and/or otherwise effectuating processor-executable instructions, such as processor-executable instructions 1010. Media 1008 is comprised of one or more processor-accessible media. In other words, media 1008 may include processor-executable instructions 1010 that are executable by processor 1006 to effectuate the performance of functions by device 1002.

Thus, realizations for spatially-scalable video coding may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1006 may be implemented using any applicable processing-capable technology. Media 1008 may be any available media that is included as part of and/or accessible by device 1002. It includes volatile and non-volatile media, removable and non-removable media, and storage and transmission media (e.g., wireless or wired communication channels). For example, media 1008 may include an array of disks for longer-term mass storage of processor-executable instructions 1010, random access memory (RAM) for shorter-term storing of instructions that are currently being executed, link(s) on network 1014 for transmitting communications (e.g., video data), and so forth.

As specifically illustrated, media 1008 comprises at least processor-executable instructions 1010. Generally, processor-executable instructions 1010, when executed by processor 1006, enable device 1002 to perform the various functions described herein, including those actions that are illustrated in flow diagrams 700 and 800 (of FIGS. 7 and 8, respectively) and those processes illustrated in FIGS. 3-6, and so forth. By way of example only, processor-executable instructions 1010 may include a video encoding coder 210 (e.g., including the components of FIG. 5), a video decoding coder 216 (e.g., including the components of FIG. 6), encoded video 218 (e.g., including image unit information such as high pass information for current image $I^H$, low pass information of residue data $I_{RES}^L$, high pass information of residue data $I_{RES}^H$, etc.), some combination thereof, and so forth.

The devices, actions, aspects, features, functions, procedures, modules, data structures, protocols, image information, components, etc. of FIGS. 1-10 are illustrated in diagrams that are divided into multiple blocks. However, the order, interconnections, interrelationships, layout, etc. in which FIGS. 1-10 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for spatially-scalable video coding.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method for encoding a current image, the method comprising:
   generating low pass information of residue data for the current image based on low pass information for the current image;
   ascertaining high pass information for the current image responsive to the current image based at least in part on calculating a difference between the current image and up-sampled information for the current image;
   ascertaining high pass information of prediction data for the current image by applying prediction data for the current image to a high-pass information determining processor that mixes the prediction data with a down-sampled then up-sampled version of the prediction data to generate the high pass information of prediction data for the current image; and
   generating high pass information of residue data for the current image based at least in part on calculating a difference between the high pass information for the current image and the high pass information of prediction data for the current image.

2. The method as recited in claim 1, wherein the generating low pass information of residue data for the current image based on low pass information for the current image comprises:
   calculating a difference between the low pass information for the current image and low pass information of prediction data for the current image.

3. The method as recited in claim 2, further comprising:
   creating the low pass information for the current image by down-sampling the current image; and
   determining the low pass information of prediction data for the current image by applying a motion compensation process to low pass information for a reference image.

4. The method as recited in claim 1, wherein the ascertaining high pass information for the current image responsive to the current image comprises:
   creating the low pass information for the current image by down-sampling the current image; and
   creating the up-sampled information for the current image by up-sampling the low pass information for the current image.

5. The method as recited in claim 1, wherein the ascertaining high pass information for the current image responsive to the current image comprises:
   ascertaining the high pass information for the current image responsive to a reconstructed version of the low pass information for the current image.

6. The method as recited in claim 1, wherein the ascertaining high pass information of prediction data for the current image responsive to prediction data for the current image comprises:
   creating low pass information of prediction data for the current image by down-sampling the prediction data for the current image to create the down-sample version of the prediction data;
   creating up-sampled information of prediction data for the current image by up-sampling the low pass information of prediction data for the current image to create the up-sampled version of the prediction data; and
   calculating, by the high-pass determining processor, a difference between the prediction data for the current image and the up-sampled information of prediction data for the current image to create the high pass information of prediction data.

7. The method as recited in claim 6, further comprising:
   determining the prediction data for the current image by applying a motion compensation process to a reference image.

8. The method as recited in claim 1, wherein the ascertaining high pass information of prediction data for the current image responsive to prediction data for the current image comprises:
   convolving a filter and the prediction data for the current image, wherein taps of the filter are acquired by minimizing an energy of residue signals given a constraint on a number of the taps of the filter.

9. The method as recited in claim 1, further comprising:
   transmitting the low pass information of residue data for the current image; and
   transmitting the high pass information of residue data for the current image that corresponds to an identified resolution level of a destination device.

10. A method for decoding a current image, the method comprising:
    generating low pass information for a reconstructed image based on low pass information of residue data for the current image;
    determining high pass information of prediction data by applying prediction data for the current image to a high-pass information determining processor that mixes the prediction data with a down-sampled then up-sampled version of the prediction data to generate the high pass information of prediction data;
    generating high pass information for the reconstructed image based on high pass information of residue data for the current image and based on the high pass information of prediction data; and
    producing a reconstructed current image by synthesizing the low pass information for the reconstructed image and the high pass information for the reconstructed image.

11. The method as recited in claim 10, wherein the generating low pass information for a reconstructed image based on low pass information of residue data for the current image comprises:
    combining the low pass information of residue data for the current image and low pass information of prediction data, the low pass information of prediction data determined from low pass information for a reference image.

12. The method as recited in claim 10, wherein the generating high pass information for the reconstructed image based on high pass information of residue data for the current image comprises:
    combining the high pass information of residue data for the current image and the high pass information of prediction data.

13. The method as recited in claim 12, further comprising:
    determining the prediction data for the current image from a reference image at a high resolution and a motion field at the high resolution.

14. The method as recited in claim 10, wherein the producing a reconstructed current image by synthesizing the low pass information for the reconstructed image and the high pass information for the reconstructed image comprises:
    up-sampling the low pass information for the reconstructed image to create up-sampled low pass information for the reconstructed image; and
    combining the up-sampled low pass information for the reconstructed image and the high pass information for the reconstructed image to produce the reconstructed current image.

15. A device comprising:
    a processor;
    a memory coupled to the processor, wherein instructions stored in the memory program the processor to:
    code a current image unit at a given resolution level using first prediction data determined at the given resolution level and second prediction data determined at a lower resolution level, the coding comprising:
    applying the first prediction data to a high pass information determining processor that mixes the first prediction data with a down-sampled then up-sampled version of the first prediction data to generate high pass information of prediction data for the current image;
    determining high pass information for the current image based at least in part on calculating a difference between the current image and up-sampled information for the current image;
    generating high pass information of residue data for the current image unit based at least in part on the high pass information for the current image and the high pass information of prediction data.

16. The device as recited in claim 15, wherein the second prediction data determined at the lower resolution level is determined from low pass information for a reference image having a time that corresponds to a time of the current image unit.

17. The device as recited in claim 15, wherein the first prediction data determined at the given resolution level is determined from a reference image having a time that differs from a time of the current image unit.

18. The device as recited in claim 15, wherein the video coder generates low pass information of residue data based on the second prediction data determined at the lower resolution level and high pass information of residue data based on the first prediction data determined at the given resolution level.

19. The device as recited in claim 15, wherein the video coder synthesizes a reconstructed version of the current image from low pass information for a reconstructed image that is based on the second prediction data determined at the lower resolution level and high pass information for the reconstructed image that is based on the first prediction data determined at the given resolution level.

* * * * *